Patented June 16, 1931

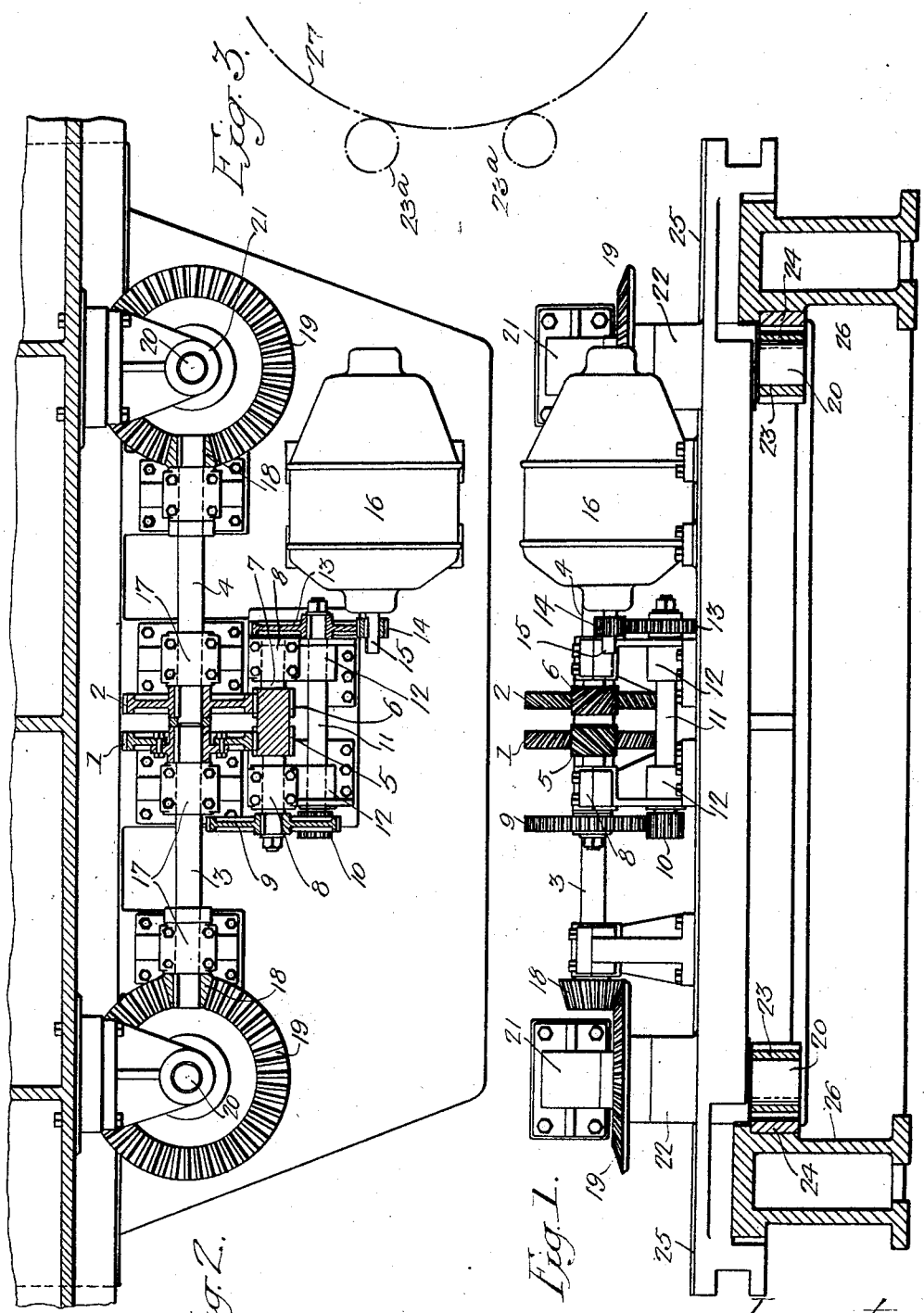

1,810,747

UNITED STATES PATENT OFFICE

GEORGE H. BENZON, JR., OF JENKINTOWN, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA

DIFFERENTIAL GEAR

Application filed September 14, 1928. Serial No. 306,023.

This invention relates to improvements in differential gears, and has for its principal object the provision of a novel differential gear having the material advantages of extreme simplicity, relatively low cost of manufacture, and relatively high efficiency as compared with gears previously employed for similar purpose.

Another object of the invention is to provide a differential gear particularly well suited as hereinafter set forth for use in boring mills, lathes, and like machines employing double-pinion drives for the moving carriages, although the utility of the gear is not restricted to such machines and may be found useful in connection with any machine requiring a limited differential.

In the attached drawings:

Figure 1 is a transverse sectional view of a differential mechanism made in accordance with the present invention, as applied to the carriage traverse mechanism of a boring and drilling machine;

Fig. 2 is a plan view of the parts shown in Fig. 1, and

Fig. 3 is a diagrammatic view illustrating another application of my invention.

With reference to the drawings, the device comprises a pair of helical gears 1 and 2, right and left hand respectively, which are independently rotatable, being attached respectively in the present instance to aligned shafts 3 and 4. Meshing respectively with the gears 1 and 2 are pinions 5 and 6, these pinions being fixed with respect to each other and constituting in effect a single double helical or herringbone pinion. This pinion 5—6 is fixed in the present instance to a shaft 7 journaled in bearings 8 and being capable of limited axial movement therein. In the present instance, the shaft 7 carries at one end a spur gear 9 which meshes with a pinion 10 on a stub shaft 11 mounted in bearings 12, and this stub shaft 11 carries at its opposite end a spur gear 13 which meshes with a pinion 14 on the armature shaft 15 of an electric motor 16, the latter constituting the source of power by which the gears 1 and 2 are driven through the intervening train of gears including the pinion 5—6.

The shafts 3 and 4 are mounted in bearings 17, and each of the shafts carries at its outer end a bevel pinion 18. Each of the pinions 18 meshes with a bevel gear 19 carried at the upper end of a vertical shaft 20, these shafts being journaled in bearings 21, 22 and having at their lower ends pinions 23 which operate in racks 24. In the present instance, the afore-described mechanism, with the exception of the racks 24, is mounted on a carriage 25 which is adjustable on a base 26 to which the racks 24 are attached, the carriage being advanced or retracted on the base in obvious manner.

In machines of this general character, in order to drive the carriage with true rectilinear movement and without twisting on the base, it is necessary to provide means for offsetting the small irregularities in the two sets of gears and racks, and it is the function of the differential mechanism, including the gears 1 and 2 and the axially movable pinion 5—6, to compensate for these irregularities. It will be apparent that any change in the relative positions of the teeth of the two racks 24 will destroy the balance of forces between these gears 1 and 2 and the pinion 5—6, and will result in an axial movement of the pinion which will tend continuously to assume a position in which the pressures on the teeth of the two gears 1 and 2 are equal. A slight difference in the pitch of the immediately associated rack which would cause the gear 2, for example, to move somewhat faster than the gear 1 will result in an axial movement of the pinion 5—6 sufficient to maintain contact equally on the teeth of the gears 1 and 2. An opposite relative action of the gears 1 and 2 obviously would produce a reaction in the opposite direction, and the amount of axial movement provided for the pinion 5—6 is in this case determined by the amount of variation in the teeth of the racks and gears.

Another useful application of my invention is to vertical boring mills, in which machines the strength and smoothness of action of the table gear are prime essentials. To afford greater strength with a given pitch and face gear as well as increased smoothness of action, two driving pinions meshing with the one table gear or rack may be employed, as shown diagrammatically in Fig. 3, and it is preferable to set the pinions so that one of the teeth of one of the pinions is just leaving the line of gear action on the table gear as a tooth on the other pinion is entering the line of action. Association in obvious manner of my differential mechanism described above with the two driving pinions will preserve this relation and a constant and uniform driving pressure between the teeth of the pinions and table gear, and will afford the best possible operating conditions.

Referring to Fig. 3, 27 is the table gear or rack represented by its pitch circle, and 23a, 23a similarly indicate the drive pinions, which it will be understood correspond to the pinions 23, 23 of the mechanism shown in Figs. 1 and 2 and previously described, this differential mechanism remaining the same.

The differential mechanism within its operative limits has material advantages of simplicity and relative efficiency over the forms of differential gearing commonly used in the prior practice. While particularly suited for use in connection with the drives of certain types of machine tools, other useful applications will be apparent, and there is to be no limitation in this respect.

I claim:

1. A differential mechanism comprising independent right and left helical gears, and a double helical gear coactive with said first-named gears and free to move axially within predetermined limits.

2. In a differential mechanism, the combination with independent drive shafts, of right and left helical gears mounted respectively on said shafts; a second pair of gears meshing therewith, said second gears being relatively fixed and axially movable within predetermined limits; and a source of power operatively connected with said last-named gears.

3. The combination with a movable carriage, of driving means therefor including a pair of drive pinions, a motor for driving said pinions, and power transmission means connecting the motor with the pinions and including a differential mechanism consisting of two helical gears right and left-hand respectively and respectively connected with said pinions, and a double helical pinion meshing with both of said helical gears and axially movable within predetermined limits.

4. The combination with relatively movable structures, of toothed means fixed to one of said structures, a pair of drive pinions meshing with said toothed means, a motor for driving said pinions, and power transmission means connecting the motor with the pinions and including a differential mechanism consisting of two helical gears right and left-hand respectively and respectively connected with said pinions, and a double helical pinion meshing with both of said helical gears and axially movable within predetermined limits.

5. The combination with a movable carriage, of rack and pinion driving means for said carriage including a pair of drive pinions, a motor for driving said pinions, and power transmission means connecting the motor with the pinions and including a differential mechanism between the latter.

6. In combination, a movable carriage, a stationary support therefor, a motor, two driving means connecting the carriage and support and each including a rotatable element, and driving connections between the motor and said rotatable elements including a differential mechanism arranged between the latter.

GEORGE H. BENZON, Jr.